(12) United States Patent
Blackburn et al.

(10) Patent No.: US 6,605,659 B2
(45) Date of Patent: Aug. 12, 2003

(54) FLAME RETARDANT POLYCARBONATE RESIN/ABS GRAFT COPOLYMER BLENDS

(75) Inventors: Kirk J. Blackburn, Mt Vernon, IN (US); Robert R. Gallucci, Mt. Vernon, IN (US); Emil M. Georgiev, Wyantskill, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/742,908

(22) Filed: Dec. 20, 2000

(65) Prior Publication Data

US 2002/0120044 A1 Aug. 29, 2002

(51) Int. Cl.$^7$ ............... C08J 5/10; C08K 5/42; C08L 69/00
(52) U.S. Cl. ............. 524/157; 524/158; 524/161; 524/121; 524/127
(58) Field of Search ............... 524/157, 158, 524/161, 121, 127, 546

(56) References Cited

U.S. PATENT DOCUMENTS

| | | | |
|---|---|---|---|
| 3,169,121 A | | 2/1965 | Goldberg |
| 3,544,514 A | | 12/1970 | Schnell et al. |
| 3,635,895 A | | 1/1972 | Kramer |
| 3,671,487 A | | 6/1972 | Abolins |
| 3,723,373 A | | 3/1973 | Lucas |
| 3,948,851 A | | 4/1976 | Mark |
| 3,953,396 A | | 4/1976 | Mark |
| 3,953,678 A | | 4/1976 | Gannett |
| 4,001,184 A | | 1/1977 | Scott |
| 4,104,253 A | | 8/1978 | Mark |
| 4,110,299 A | | 8/1978 | Mark |
| 4,220,583 A | | 9/1980 | Mark |
| 4,239,678 A | | 12/1980 | Williams |
| 4,430,484 A | | 2/1984 | Quinn |
| 4,440,890 A | * | 4/1984 | Robeson .............. 524/159 |
| 4,476,275 A | | 10/1984 | Giddings et al. |
| 4,487,896 A | | 12/1984 | Mark et al. |
| 4,579,906 A | | 4/1986 | Zabrocki et al. |
| 4,918,125 A | | 4/1990 | Boutni |
| 5,204,394 A | | 4/1993 | Gosens et al. |
| 5,356,965 A | * | 10/1994 | Weider et al. .............. 524/108 |
| 5,411,999 A | | 5/1995 | Gallucci |
| 5,521,230 A | | 5/1996 | Bhatia et al. |
| 5,672,645 A | | 9/1997 | Eckel et al. |
| 6,084,054 A | | 7/2000 | Barren et al. |
| 6,117,969 A | | 9/2000 | Nanba et al. |

FOREIGN PATENT DOCUMENTS

| | | |
|---|---|---|
| EP | 0 352 822 A2 | 1/1990 |
| EP | 0 739 914 A1 | 10/1996 |
| EP | 0 933 396 A2 | 8/1999 |
| EP | 0979840 A | 2/2000 |
| EP | 0 739 914 B1 | 6/2000 |
| WO | WO 00/12614 | 3/2000 |
| WO | WO 99/40158 | 8/2001 |

OTHER PUBLICATIONS

Abstract JP2001181639 Jul. 3, 2001.
Abstract JP06299060 Oct. 25, 1994.

* cited by examiner

*Primary Examiner*—James J. Seidleck
*Assistant Examiner*—U. K Rajguru

(57) ABSTRACT

A thermoplastic resin composition contains an aromatic carbonate resin, a rubber modified graft copolymer comprising a discontinuous rubber phase dispersed in a continuous rigid thermoplastic phase, wherein at least a portion of the rigid thermoplastic phase is chemically grafted to the rubber phase, and a flame retarding amount of an alkali metal or alkaline earth metal salt of an alkylbenzenesulfonic acid flame retardant.

32 Claims, No Drawings

FLAME RETARDANT POLYCARBONATE RESIN/ABS GRAFT COPOLYMER BLENDS

FIELD OF THE INVENTION

The invention relates to flame retardant polycarbonate resin/ABS graft copolymer blends that exhibit improved performance.

BRIEF DESCRIPTION OF THE RELATED ART

Flame retardant thermoplastic compositions that contain an aromatic polycarbonate resin and a benzenesulfonic acid salt have been found to exhibit good flame retardancy, see for example U.S. Pat. No. 4,220,583.

Flame retardant thermoplastic resin compositions that contain an aromatic polycarbonate resin, an ABS graft copolymer, a fluoropolymer and an organophosphate flame retardant are known and have been found to exhibit good flame retardency and good heat resistance, see, for example, coassigned U.S. Pat. No. 5,204,394.

Flame retardant resin compositions that exhibit low melt viscosity and impart improved aesthetic appearance, particularly, improved resistance to streaking, and improved physical properties, particularly, improved resistance to edge cracking, to articles molded therefrom are desired.

SUMMARY OF THE INVENTION

In one embodiment the thermoplastic resin composition of the present invention comprises:

(a) an aromatic polycarbonate resin, (b) a rubber modified graft copolymer comprising a discontinuous rubber phase dispersed in a continuous rigid thermoplastic phase, wherein at least a portion of the rigid thermoplastic phase is chemically grafted to the rubber phase (c) a flame retarding amount of an alkali metal or alkaline earth metal salt of an sulfonic acid flame retardant compound selected from the group consisting of:

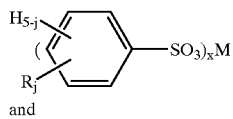

and

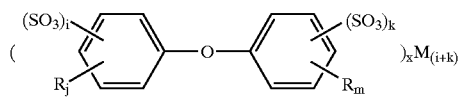

where R is independently for each substitution a one to forty carbon atom alkyl, aralkyl or aromatic group, M is a metal selected from the group of alkali metals and alkaline earth metals with x the oxidation state of the metal, M, where i, j, k and m are each integers ranging from 0 to 5 subject to the limitation that i+k is at least 1 and subject to the further limitation that i+j is less than or equal to 5 and k+m is less than or equal to 5.

DETAILED DESCRIPTION OF THE INVENTION

In a preferred embodiment, the thermoplastic resin composition of the present invention comprises, based on 100 parts by weight ("pbw") of thermoplastic resin composition, from 55 to 80 pbw, more preferably from 50 to 90 pbw, even more preferably from 40 to 96 pbw, of the aromatic polycarbonate resin, from 14 to 39 pbw, more preferably from 8 to 48 pbw, even more preferably from 4 to 59 pbw, of the rubber modified graft copolymer and from 0 to 20 pbw, more preferably from 2 to 15 pbw, even more preferably from 6 to 12 pbw, of the organophosphate flame retardant.

Aromatic polycarbonate resins suitable for use as the polycarbonate resin component of the thermoplastic resin composition of the present invention are known compounds whose preparation and properties have been described, see, generally, U.S. Pat. Nos. 3,169,121, 4,487,896 and 5,411,999, the respective disclosures of which are each incorporated herein by reference.

In a preferred embodiment, the aromatic polycarbonate resin component of the present invention is the reaction product of a dihydric phenol according to the structural formula (I):

$$\text{HO—A—OH} \qquad (I)$$

wherein A is a divalent aromatic radical,
with a carbonate precursor and contains structural units according to the formula (II):

wherein A is defined as above.

As used herein, the term "divalent aromatic radical" includes those divalent radicals containing a single aromatic ring such as phenylene, those divalent radicals containing a condensed aromatic ring system such as, for example, naphthlene, those divalent radicals containing two or more aromatic rings joined by a non-aromatic linkage, such as for example, an alkylene, alkylidene or sulfonyl group, any of which may be substituted at one or more sites on the aromatic ring with, for example, a halo group or $(C_1-C_6)$ alkyl group.

In a preferred embodiment, A is a divalent aromatic radical according to the formula (III):

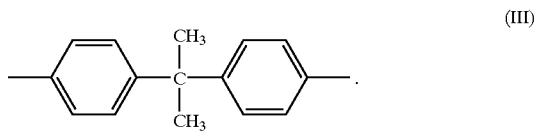

Suitable dihydric phenols include, for example, one or more of 2, 2-bis-(4-hydroxyphenyl) propane ("bisphenol A"), 2,2-bis(3,5-dimethyl-4-hydroxyphenyl)propane, bis(4-hydroxyphenyl) methane, 4,4-bis(4-hydroxyphenyl) heptane, 3,5,3',5'-tetrachloro-4,4'-dihydroxyphenyl) propane, 2,6-dihydroxy naphthalene, hydroquinone, 2,4'-dihydroxyphenyl sulfone. In a highly preferred embodiment, the dihydric phenol is bisphenol A.

The carbonate precursor is one or more of a carbonyl halide, a carbonate ester or a haloformate. Suitable carbonyl halides include, for example, carbonyl bromide and carbonyl chloride. Suitable carbonate esters include, such as for example, diphenyl carbonate, dichlorophenyl carbonate, dinaphthyl carbonate, phenyl tolyl carbonate and ditolyl carbonate. Suitable haloformates include, for example, bishaloformates of dihydric phenols, such as, for example, hydroquinone, or glycols, such as, for example, ethylene glycol, neopentyl glycol. In a highly preferred embodiment, the carbonate precursor is carbonyl chloride.

Suitable aromatic polycarbonate resins include linear aromatic polycarbonate resins, branched aromatic polycarbonate resins. Suitable linear aromatic polycarbonates resins include, e.g., bisphenol A polycarbonate resin.

Suitable branched polycarbonates are known and are made by reacting a polyfunctional aromatic compound with a dihydric phenol and a carbonate precursor to form a branched polymer, see generally, U.S. Pat. Nos. 3,544,514, 3,635,895 and 4,001,184, the respective disclosures of which are incorporated herein by reference. The polyfunctional compounds are generally aromatic and contain at least three functional groups which are carboxyl, carboxylic anhydrides, phenols, haloformates or mixtures thereof, such as, for example, 1,1,1-tri(4-hydroxyphenyl)ethane, 1,3,5,-trihydroxybenzene, trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenone-tetracarboxylic dianhydride. The preferred polyfunctional aromatic compounds are 1,1,1-tri(4-hydroxyphenyl)ethane, trimellitic anhydride or trimellitic acid or their haloformate derivatives.

In a preferred embodiment, the polycarbonate resin component of the present invention is a linear polycarbonate resin derived from bisphenol A and phosgene.

In a preferred embodiment, the weight average molecular weight of the polycarbonate resin is from about 10,000 to about 200,000 grams per mole ("g/mol"), as determined by gel permeation chromatography relative to polystyrene. Such resins typically exhibit an intrinsic viscosity of about 0.3 to about 1.5 deciliters per gram in methylene chloride at 25° C.

Polycarbonate resins are made by known methods, such as, for example, interfacial polymerization, transesterification, solution polymerization or melt polymerization.

Copolyester-carbonate resins are also suitable for use as the aromatic polycarbonate resin component of the present invention. Copolyester-carbonate resins suitable for use as the aromatic polycarbonate resin component of the thermoplastic resin composition of the present invention are known compounds whose preparation and properties have been described, see, generally, U.S. Pat. Nos. 3,169,121, 4,430,484 and 4,487,896, the respective disclosures of which are each incorporated herein by reference.

Copolyester-carbonate resins comprise linear or randomly branched polymers that contain recurring carbonate groups, carboxylate groups and aromatic carbocyclic groups in the polymer chain, in which at least some of the carbonate groups are bonded directly to the ring carbon atoms of the aromatic carbocyclic groups.

In a preferred embodiment, the copolyester-carbonate resin component of the present invention is derived from a carbonate precursor, at least one dihydric phenol and at least one dicarboxylic acid or dicarboxylic acid equivalent. In a preferred embodiment, the dicarboxylic acid is one according to the formula (IV):

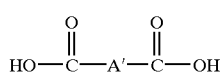

(IV)

wherein A' is alkylene, alkylidene, cycloaliphatic or aromatic and is preferably a non-substituted phenylene radical or a substituted phenylene radical that is substituted at one or more sites on the aromatic ring, wherein each of such substituent groups is independently ($C_1$–$C_6$) alkyl, and the copolyester carbonate resin comprises first structural units according to formula (IV) above and second structural units according to formula (V):

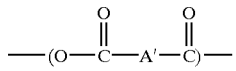

(V)

wherein A' is defined as above.

Suitable carbonate precursors and dihydric phenols are those disclosed above.

Suitable dicarboxylic acids, include, for example, phthalic acid, isophthalic acid, terephthalic acid, dimethyl terephthalic acid, oxalic acid, malonic acid, succinic acid, glutaric acid, adipic acid, pimelic acid, suberic acid, azelaic acid, sebacic acid, dimethyl malonic acid, 1,12-dodecanoic acid, cis-1,4-cyclohexane dicarboxylic acid, trans-1,4-cyclohexane dicarboxylic acid, 4,4'-bisbenzoic acid, naphthalene-2,6-dicarboxylic acid. Suitable dicarboxylic acid equivalents include, for example, anhydride, ester or halide derivatives of the above disclosed dicarboxylic acids, such as, for example, phthalic anhydride, dimethyl terephthalate, succinyl chloride.

In a preferred embodiment, the dicarboxylic acid is an aromatic dicarboxylic acid, more preferably one or more of terephthalic acid and isophthalic acid.

In a preferred embodiment, the ratio of ester bonds to carbonate bonds present in the copolyester carbonate resin is from 0.25 to 0.9 ester bonds per carbonate bond.

In a preferred embodiment, the copolyester-carbonate copolymer has a weight average molecular weight of from about 10,000 to about 200,000 g/mol.

Copolyester-carbonate resins are made by known methods, such as, for example, interfacial polymerization, transesterification, solution polymerization or melt polymerization.

Rubber modified thermoplastic resins suitable for use as the rubber modified thermoplastic resin of the present invention are those rubber modified thermoplastic resins that are made by a bulk or, synonymously, mass, polymerization process and that comprise a discontinuous rubber phase dispersed in a continuous rigid thermoplastic phase, wherein at least a portion of the rigid thermoplastic phase is chemically grafted to the rubber phase.

Suitable rubbers for use in making the rubber phase are those rubber polymers having a glass transition temperature ($T_g$) of less than or equal to 25° C., more preferably less than or equal to 0° C., and even more preferably less than or equal to –30° C. As referred to herein, the $T_g$ of a polymer is the $T_g$ value of polymer as measured by differential scanning calorimetry (heating rate 20° C./minute, with the $T_g$ value being determined at the inflection point).

In a preferred embodiment, the rubber comprises a linear polymer having structural units derived from one or more conjugated diene monomers.

Suitable conjugated diene monomers include, e.g., 1,3-butadiene, isoprene, 1,3-heptadiene, methyl-1,3-pentadiene, 2,3-dimethylbutadiene, 2-ethyl-1,3-pentadiene, 1,3-hexadiene, 2, 4, hexadiene, dichlorobutadiene, bromobutadiene and dibromobutadiene as well as mixtures of conjugated diene monomers. In a preferred embodiment, the conjugated diene monomer is 1,3-butadiene.

The rubber may, optionally, include structural units derived from one or more copolymerizable monoethylenically unsaturated monomers selected from ($C_2$–$C_8$)olefin monomers, vinyl aromatic monomers and monoethylenically unsaturated nitrile monomers and ($C_1$–$C_{12}$)alkyl (meth)acrylate monomers.

As used herein, the term "($C_2$–$C_8$)olefin monomers" means a compound having from 2 to 8 carbon atoms per molecule and having a single site of ethylenic unsaturation per molecule. Suitable ($C_2$–$C_8$)olefin monomers include, e.g., ethylene, propene, 1-butene, 1-pentene, heptene.

Suitable vinyl aromatic monomers include, e.g., styrene and substituted styrenes having one or more alkyl, alkoxyl, hydroxyl or halo substituent group attached to the aromatic ring, including, e.g., α-methyl styrene, p-methyl styrene, vinyl toluene, vinyl xylene, trimethyl styrene, butyl styrene, chlorostyrene, dichlorostyrene, bromostyrene, p-hydroxystyrene, methoxystyrene and vinyl-substituted condensed aromatic ring structures, such as, e.g., vinyl naphthalene, vinyl anthracene, as well as mixtures of vinyl aromatic monomers.

As used herein, the term "monoethylenically unsaturated nitrile monomer" means an acyclic compound that includes a single nitrile group and a single site of ethylenic unsaturation per molecule and includes, e.g., acrylonitrile, methacrylonitrile, α-chloro acrylonitrile.

As used herein, the term "$(C_1–C_{12})$alkyl" means a straight or branched alkyl substituent group having from 1 to 12 carbon atoms per group and includes, e.g., methyl, ethyl, n-butyl, sec-butyl, t-butyl, n-propyl, iso-propyl, pentyl, hexyl, heptyl, octyl, nonyl, decyl, undecyl and dodecyl, and the terminology "(meth)acrylate monomers" refers collectively to acrylate monomers and methacrylate monomers. Suitable $(C_1–C_{12})$alkyl (meth)acrylate monomers include $(C_1–C_{12})$alkyl acrylate monomers, e.g., ethyl acrylate, butyl acrylate, iso-pentyl acrylate, n-hexyl acrylate, 2-ethyl hexyl acrylate, and their $(C_1–C_{12})$alkyl methacrylate analogs such as, e.g., methyl methacrylate, ethyl methacrylate, propyl methacrylate, iso-propyl methacrylate, butyl methacrylate, hexyl methacrylate, decyl methacrylate.

In a first preferred embodiment, the rubber is a polybutadiene homopolymer.

In an alternative preferred embodiment, the rubber is a copolymer, preferably a block copolymer, comprising structural units derived from one or more conjugated diene monomers and up to 50 percent by weight ("wt %") structural units derived from one or more monomers selected from vinyl aromatic monomers and monoethylenically unsaturated nitrile monomers, such as, for example, a styrene-butadiene copolymer, an acrylonitrile-butadiene copolymer or a styrene-butadiene-acrylonitrile copolymer.

In a highly preferred embodiment, the rubber is a styrene-butadiene block copolymer that contains from 50 to 95 wt % structural units derived from butadiene and from 5 to 50 wt % structural units derived from styrene.

The elastomeric phase is made by aqueous emulsion polymerization in the presence of a free radical initiator, a polyacid surfactant and, optionally, a chain transfer agent and coagulated to form particles of elastomeric phase material.

Suitable initiators include conventional free radical initiators such as, e.g., an organic peroxide compound, such as e.g., benzoyl peroxide, a persulfate compound, such as, e.g., potassium persulfate, an azonitrile compound such as, e.g., 2,2'-azobis-2,3,3-trimethylbutyronitrile, or a redox initiator system, such as, e.g., a combination of cumene hydroperoxide, ferrous sulfate, tetrasodium pyrophosphate and a reducing sugar or sodium formaldehyde sulfoxylate.

Suitable chain transfer agents include, for example, a $(C_9–C_{13})$ alkyl mercaptan compound such as nonyl mercaptan, t-dodecyl mercaptan.

In a preferred embodiment, the emulsion polymerized particles of elastomeric phase material have a weight average particle size of 50 to 800 nanometers ("nm"), more preferably, of from 100 to 500 nm, as measured by light transmission. The size of emulsion polymerized elastomeric particles may optionally be increased by mechanical, colloidal or chemical agglomeration of the emulsion polymerized particles, according to known techniques. In another preferred embodiment the emulsion polymerization is carried out in the presence of an amount of a chain transfer agent effective to provide a rubber having a swell index of greater than 15.

The rigid thermoplastic resin phase comprises one or more thermoplastic polymers and exhibits a $T_g$ of greater than 25° C., preferably greater than or equal to 90° C. and even more preferably greater than or equal to 100° C.

In a preferred embodiment, the rigid thermoplastic phase comprises one or more polymers each having structural units derived from one or more monomers selected from the group consisting of $(C_1–C_{12})$alkyl (meth)acrylate monomers, vinyl aromatic monomers and monoethylenically unsaturated nitrile monomers.

Suitable vinyl aromatic monomers and monoethylenically unsaturated nitrile monomers and of $(C_1–C_{12})$ alkyl (meth)acrylate monomers are those set forth above in the description of the rubber phase.

In a preferred embodiment, the rigid thermoplastic resin phase comprises a vinyl aromatic polymer having first structural units derived from one or more vinyl aromatic monomers, preferably styrene, and having second structural units derived from one or more monoethylenically unsaturated nitrile monomers, preferably acrylonitrile. More preferably, the rigid phase comprises from 55 to 99 wt %, still more preferably 60 to 90 wt %, structural units derived from styrene and from 1 to 45 wt %, still more preferably 10 to 40 wt %, structural units derived from acrylonitrile.

The amount of grafting that takes place between the rigid thermoplastic phase and the rubber phase varies with the relative amount and composition of the rubber phase. In a preferred embodiment, from 10 to 90 wt %, preferably from 25 to 60 wt %, of the rigid thermoplastic phase is chemically grafted to the rubber phase and from 10 to 90 wt %, preferably from 40 to 75 wt % of the rigid thermoplastic phase remains "free, i.e., non-grafted.

The rigid thermoplastic phase of the rubber modified thermoplastic resin may be formed: (i) solely by polymerization carried out in the presence of the rubber phase or (ii) by addition of one or more separately polymerized rigid thermoplastic polymers to a rigid thermoplastic polymer that has been polymerized in the presence of the rubber phase.

In a preferred embodiment, one or more separately polymerized rigid thermoplastic polymers is grafted to a rigid thermoplastic polymer that has been polymerized in the presence of the rubber phase in order to aid in adjusting the viscosity of the composition of the present invention into the desired range. In a more highly preferred embodiment, the weight average molecular weight of the one or more separately polymerized rigid thermoplastic polymers is from about 50,000 to about 100,000 g/mol.

In a preferred embodiment, the rubber modified thermoplastic resin comprises a rubber phase comprising a polymer having structural units derived from one or more conjugated diene monomers, and, optionally, further comprising structural units derived from one or more monomers selected from vinyl aromatic monomers and monoethylenically unsaturated nitrile monomers, and the rigid thermoplastic phase comprises a polymer having structural units derived from one or more monomers selected from vinyl aromatic monomers and monoethylenically unsaturated nitrile monomers.

In a highly preferred embodiment, the rubber phase of the rubber modified graft copolymer comprises a polybutadiene or poly(styrene-butadiene) rubber and the rigid phase comprises a styrene-acrylonitrile copolymer.

Each of the polymers of the rubber phase and of the rigid thermoplastic resin phase of the rubber modified thermoplastic resin may, provided that the $T_g$ limitation for the respective phase is satisfied, optionally include structural units derived from one or more other copolymerizable monoethylenically unsaturated monomers such as, e.g., monoethylenically unsaturated carboxylic acids such as, e.g., acrylic acid, methacrylic acid, itaconic acid, hydroxy $(C_1–C_{12})$alkyl (meth)acrylate monomers such as, e.g., hydroxyethyl methacrylate; ($C_4$–$C_{12}$)cycloalkyl (meth) acrylate monomers such as e.g., cyclohexyl methacrylate; (meth)acrylamide monomers such as e.g., acrylamide and methacrylamide; maleimide monomers such as, e.g., N-alkyl maleimides, N-aryl maleimides, maleic anhydride, vinyl esters such as, e.g., vinyl acetate and vinyl propionate. As used herein, the term "($C_4$–$C_{12}$)cycloalkyl" means a cyclic alkyl substituent group having from 4 to 12 carbon atoms per group and the term "(meth)acrylamide" refers collectively to acrylamides and methacrylamides.

In a preferred embodiment, the rubber phase of rubber modified thermoplastic resin has a particle size of from 0.1 to 3.0 micrometers ("$\mu$m") more preferably from 0.2 to 2.0 $\mu$m.

In a preferred embodiment, the composition of the present invention includes a fluoropolymer, in an amount, typically from 0.01 to 1.0 pbw fluoropolymer per 100 pbw of the thermoplastic resin composition, that is effective to provide anti-drip properties to the resin composition. Suitable fluoropolymers and methods for making such fluoropolymers are known, see, e.g., U.S. Pat. Nos. 3,671,487, and 3,723,373. Suitable fluoropolymers include homopolymers and copolymers that comprise structural units derived from one or more fluorinated $\alpha$-olefin monomers. The term "fluorinated $\alpha$-olefin monomer" means an $\alpha$-olefin monomer that includes at least one fluorine atom substituent. Suitable fluorinated $\alpha$-olefin monomers include, e.g., fluoroethylenes such as, e.g., $CF_2{=}CF_2$, $CHF{=}CF_2$, $CH_2{=}CF_2$, $CH_2{=}CHF$, $CClF{=}CF_2$, $CCl_2{=}CF_2$, $CClF{=}CClF$, $CHF{=}CCl_2$, $CH_2{=}CClF$, and $CCl_2{=}CClF$ and fluoropropylenes such as, e.g., $CF_3CF{=}CF_2$, $CF_3CH{=}CHF$, $CF_3CH{=}CF_2$, $CF_3CH{=}CH_2$, $CF_3CF{=}CHF$, $CHF_2CH{=}CHF$ and $CF_3CF{=}CH_2$. In a preferred embodiment, the fluorinated $\alpha$-olefin monomer is one or more of tetrafluoroethylene ($CF_2{=}CF_2$), chlorotrichloroethylene ($CClF{=}CF_2$), vinylidene fluoride ($CH_2{=}CF_2$) and hexafluoropropylene ($CF_2{=}CFCF_3$).

Suitable fluorinated $\alpha$-olefin homopolymers include e.g., poly(tetrafluoroethylene), poly(hexafluoroethylene).

Suitable fluorinated $\alpha$-olefin copolymers include copolymers comprising structural units derived from two or more fluorinated $\alpha$-olefin copolymers such as, e.g., poly(tetrafluoroethylene-hexafluoroethylene), and copolymers comprising structural units derived from one or more fluorinated monomers and one or more non-fluorinated monoethylenically unsaturated monomers that are copolymerizable with the fluorinated monomers such as, e.g., poly(tetrafluoroethylene-ethylene-propylene) copolymers. Suitable non-fluorinated monoethylenically unsaturated monomers include e.g., $\alpha$-olefin monomers such as, e.g., ethylene, propylene butene, acrylate monomers such as e.g., methyl methacrylate, butyl acrylate, vinyl ethers, such as, e.g., cyclohexyl vinyl ether, ethyl vinyl ether, n-butyl vinyl ether, vinyl esters such as, e.g., vinyl acetate, vinyl versatate.

In a preferred embodiment, the fluoropolymer particles range in size from 50 to 500 nm, as measured by electron microscopy.

In a preferred embodiment, the fluoropolymer is a poly(tetrafluoroethylene) homopolymer ("PTFE").

Since direct incorporation of a fluoropolymer into a thermoplastic resin composition tends to be difficult, it is preferred that the fluoropolymer be pre-blended in some manner with a second polymer, such as for, example, an aromatic polycarbonate resin or a styrene-acrylonitrile resin. For example, an aqueous dispersion of fluoropolymer and a polycarbonate resin may be steam precipitated to form a fluoropolymer concentrate for use as a drip inhibitor additive in thermoplastic resin composition, as disclosed in, for example, U.S. Pat. No. 5,521,230, or, alternatively, an aqueous styrene-acrylonitrile resin emulsion or an aqueous acrylonitrile-butadiene-styrene resin emulsion and then pre-cipitating and drying the co-coagulated fluoropolymer-thermoplastic resin composition to provide a PTFE-thermoplastic resin powder as disclosed in, for example, U.S. Pat. No. 4,579,906.

In another embodiment, the fluoropolymer additive comprises from 30 to 70 wt %, more preferably 40 to 60 wt %, of the fluoropolymer and from 30 to 70 wt %, more preferably 40 to 60 wt %, of the second polymer.

In another embodiment, a fluoropolymer additive is made by emulsion polymerization of one or more monoethylenically unsaturated monomers in the presence of the aqueous fluoropolymer dispersion utilized in the present invention to form a second polymer in the presence of the fluoropolymer. Suitable monoethylenically unsaturated monomers are disclosed above. The emulsion is then precipitated, e.g., by addition of sulfuric acid. The precipitate is dewatered, e.g., by centrifugation, and then dried to form a fluoropolymer additive that comprises fluoropolymer and an associated second polymer. The dry emulsion polymerized fluoropolymer additive is in the form of a free-flowing powder.

In another embodiment, the monoethylenically unsaturated monomers that are emulsion polymerized to form the second polymer comprise one or more monomers selected from vinyl aromatic monomers, monoethylenically unsaturated nitrile monomer and ($C_1$–$C_{12}$)alkyl (meth)acrylate monomers. Suitable vinyl aromatic monomers, monoethylenically unsaturated nitrile monomer and ($C_1$–$C_{12}$)alkyl (meth)acrylate monomers are disclosed above.

In a highly preferred embodiment, the second polymer comprises structural units derived from styrene and acrylonitrile. More preferably, the second polymer comprises from 60 to 90 wt % structural units derived from styrene and from 10 to 40 wt % structural units derived from acrylonitrile.

The emulsion polymerization reaction mixture may optionally include emulsified or dispersed particles of a third polymer, such as, e.g., an emulsified butadiene rubber latex.

The emulsion polymerization reaction is initiated using a conventional free radical initiator, as disclosed above with respect to the rubber modified graft copolymer.

A chain transfer agent such as, e.g., a ($C_9$–$C_{13}$) alkyl mercaptan compound such as nonyl mercaptan, t-dodecyl mercaptan, may, optionally, be added to the reaction vessel during the polymerization reaction to reduce the molecular weight of the second polymer. In a preferred embodiment, no chain transfer agent is used.

In another embodiment, the stabilized fluoropolymer dispersion is charged to a reaction vessel and heated with stirring. The initiator system and the one or more monoethylenically unsaturated monomers are then charged to the reaction vessel and heated to polymerize the monomers in the presence of the fluoropolymer particles of the dispersion to thereby form the second polymer.

Suitable fluoropolymer additives and emulsion polymerization methods are disclosed in EP 0 739 914 A1.

In a preferred embodiment, the second polymer exhibits a weight average molecular weight of from about 10,000 to about 200,000 g/mol.

When polycarbonate and ABS rubbers are compounded together to produce a composition comprising both thermoplastic materials, the flammability of the resulting mixture increases dramatically. It has unexpectedly been found that salts of substituted benzenesulfonic acids act as flame retardant materials for such materials. Accordingly the compositions of the present invention comprise a flame retarding amount of a salt of a substituted aromatic sulfonic acid selected from the group consisting of:

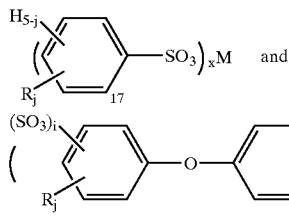
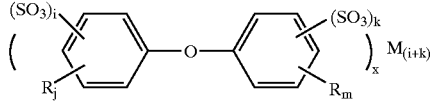

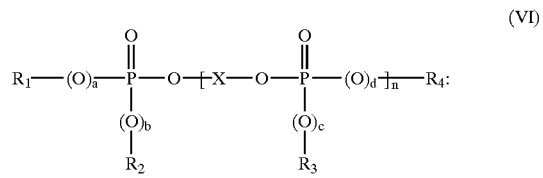

where R is independently for each substitution a one to forty carbon atom alkyl, aralkyl or aromatic group, M is a metal selected from the group of alkali metals and alkaline earth metals with x the oxidation state of the metal, M, where i, j, k and m are each integers ranging from 0 to 5 subject to the limitation that i+k is at least 1 and subject to the further limitation that i +j is less than or equal to 5 and k+m is less than or equal to 5. Preferably R is an alkyl group having from 3 to 22 carbon atoms, more preferably 8 to 14 carbon atoms and most preferably 12 carbon atoms. Preferred metals are selected from the group consisting of periodic table Group Ia and Group IIA metals, more preferred metals are selected from the group consisting of Group IA metals and the most preferred metal is sodium. While the present invention is centered around benzenesulfonic acid salts and diphenylether sulfonic acid salts of alkali metal and alkaline earth metals, other aromatic centers that can be subsituted by an alkyl group and that can be sulfonated to form homologous sulfonic acids may also be used, e.g. other fused ring aromatic systems. In contrast to other sulfonic acid salts with electron withdrawing groups, the present invention utilizes sulfonates where the aromatic centers possess one or more electron donating groups. When the alkyl-benzenesulfonic acid salts are incorporated into a polymer for a flame retarding effect generally an amount effective to produce a retardation in combustion is employed. This amount ranges from about 0.01 weight percent to about 5.0 weight percent of the total composition, more preferably from about 0.02 weight percent to about 1.0 weight percent of the total composition, and most preferably from about 0.05 weight percent to about 0.15 weight percent of the total composition.

Additionally organophosphorus compounds may be suitable as an added flame retardant for the compositions of the present invention. Known compounds including monophosphate esters such as, for example, triphenyl phosphate, tricresyl phosphate, tritolyl phosphate, diphenyl tricresylphosphate, phenyl bisdodecyl phosphate, ethyl diphenyl phosphate, as well as diphosphate esters and oligomeric phosphates such as, for example, resorcinol diphosphate, diphenyl hydrogen phosphate, 2-ethylhexyl hydrogen phosphate have been found to be useful. Suitable oligomeric phosphate compounds are set forth in coassigned U.S. Pat. No. 5,672,645, Eckel et al. for a "Flame Resistant Polycarbonate/ABS Moulding Compounds Resistant to Stress Cracking", the disclosure of which is hereby incorporated herein by reference.

Additionally, the organophosphorus flame retardants useful in the compositions of the present invention comprises one or more compounds according to the structural formula:

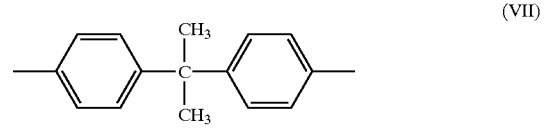

wherein $R_1$, $R_2$, $R_3$ and $R_4$ are each independently aryl, which may be optionally substituted with halo or alkyl, X is arylene, optionally substituted with halo or alkyl, a, b, c and d are each independently 0 or 1, and n is an integer of from 0 to 5, more preferably from 1 to 5.

As used herein, aryl means a monovalent radical containing one or more aromatic rings per radical, which, in the case wherein the radical contains two or more rings, may be fused rings and which may optionally be substituted on the one or more aromatic rings with one or more alkyl groups, each preferably $(C_1-C_6)$alkyl.

As used herein, arylene means a divalent radical containing one or more aromatic rings per radical, which may optionally be substituted on the one or more aromatic rings with one or more alkyl groups, each preferably $(C_1-C_6)$alkyl and which, in the case wherein the divalent radical contains two or more rings, the rings may be may be fused or may be joined by a non-aromatic linkages, such as for example, an alkylene, alkylidene, any of which may be substituted at one or more sites on the aromatic ring with a halo group or $(C_1-C_6)$alkyl group.

In a highly preferred embodiment, $R_1$, $R_2$, $R_3$ and $R_4$ are each phenyl, a, b, c and d are each 1 and X is phenylene, more preferably 1,3-phenylene.

In an alternative highly preferred embodiment, embodiment, $R_1$, $R_2$, $R_3$ and $R_4$ are each phenyl, a, b, c and d are each 1 and X is a divalent radical according to the structural formula (VII):

(VII)

$$\text{—}\phantom{x}\underset{\underset{CH_3}{|}}{\overset{\overset{CH_3}{|}}{C}}\phantom{x}\text{—}$$

In another embodiment, the organophosphorus flame retardant comprises a blend of organophosphorus oligomers, each according to formula (VI), wherein n is, independently for each oligomer, an integer from 1 to 5 and wherein the blend of oligomers has an average n of from greater than 1 to less than 5, more preferably greater than 1 to less than 3, even more preferably greater than 1 to less than 2, still more preferably from 1.2 to 1.7.

The thermoplastic resin composition of the present invention may optionally also contain various conventional additives, such as antioxidants, such as, e.g., organophosphites, e.g., tris(nonyl-phenyl)phosphite, (2,4,6-tri-tert-butylphenyl)(2-butyl-2-ethyl-1,3-propanediol) phosphite, bis(2,4-di-t-butylphenyl)pentaerythritol diphosphite or distearyl pentaerythritol diphosphite, as well as alkylated monophenols, polyphenols, alkylated reaction products of polyphenols with dienes, such as, e.g., butylated reaction products of para-cresol and dicyclopentadiene, alkylated hydroquinones, hydroxylated thiodiphenyl ethers, alkylidene-bisphenols, benzyl compounds, acylaminophenols, esters of beta-(3,5-di-tert-butyl-4-hydroxyphenol)-propionic acid with monohydric or polyhydric alcohols, esters of thioalkyl or thioaryl compounds, such as, e.g., distearylthiopropionate, dilaurylthiopropionate, ditridecylthiodipropionate, amides of beta-(3,5-di-tert-butyl-4-hydroxyphenol)-propionic acid; UV absorbers and light stabilizers such as, e.g., (i) 2-(2'-hydroxyphenyl)-benzotriazoles, 2-Hydroxy-benzophenones; (ii) esters of substituted and unsubstituted benzoic acids, (iii) acrylates, (iv) nickel compounds; sterically hindered amines such as, e.g., triisopropanol amine or the reaction product of 2,4-dichloro-6-(4-morpholinyl)-1,3,5-triazine with a polymer of 1,6-diamine, N,N'-Bis(-2, 2, 4, 6 -tetramethyl-4-piperidenyl) hexane; neutralizers such as magnesium stearate, magnesium oxide, zinc oxide, zinc stearate, hydrotalcite; impact modifiers; fillers and reinforcing agents, such as, e.g., silicates, $TiO_2$, glass fibers, carbon black, graphite, calcium carbonate, talc, mica; and other additives such as, e.g., lubricants such as, e.g., pentaerythritol tetrastearate, EBS wax, silicone fluids, plasticizers, optical brighteners, pigments, dyes, colorants, flameproofing agents; anti-static agents; and blowing agents, as well as other flame retardants in addition to the above-disclosed organophosphorus flame retardant and fluoropolymer.

The thermoplastic resin composition of the present invention is made by combining and mixing the components of the composition of the present invention under conditions suitable for the formation of a blend of the components, such as for example, by melt mixing using, for example, a two-roll mill, a Banbury mixer or a single screw or twin-screw extruder, and, optionally, then reducing the composition so formed to particulate form, e.g., by pelletizing or grinding the composition.

The thermoplastic resin composition of the present invention can be molded into useful shaped articles by a variety of means such as injection molding, extrusion, rotational molding, blow molding and thermoforming to form articles such as, for example, computer and business machine housings, home appliances.

While typical embodiments have been set forth for the purpose of illustration, the foregoing descriptions and examples should not be deemed to be a limitation on the scope of the invention. Accordingly, various modifications, adaptations, and alternatives may occur to one skilled in the art without departing from the spirit and scope of the present invention.

EXAMPLES

The formulations, in percent, in Table 1 are tumble blended and compounded and pelletized on a Werner-Pfleiderer 30mm twin screw extruder. Barrel temperatures were set at 530° F. using a through put of 40 kg/hr. The resulting pellets were dried for 4 hours in a forced air oven at 200° F. before being molded into test specimens. The molding machine used was an 85 ton Van Dorn with barrel and mold temperatures set at 540° F. and 170° F. respectively. The test protocol followed was the Underwriter Laboratory 94, vertical burn test where the flammability ratings are from least to most flammable, V-0, V-1, V-2 and B (burning) and part thickness is in millimeters. The components in the formulations tabulated below in Table 1 are as follows:

TABLE 1

Compositions of Samples Tested

| Component | A | B | C | D | E | F | G | H | I | J |
|---|---|---|---|---|---|---|---|---|---|---|
| 1 | 100 | 100 | 100 | 95 | 95 | 94 | 93 | 100 | 100 | 100 |
| 2 | — | — | — | 4 | 4 | 5 | 6 | — | — | — |
| 3 | — | 0.08 | — | 0.1 | — | — | — | — | — | — |
| 4 | — | — | — | 0.8 | 0.8 | 0.8 | 0.8 | 0.8 | 0.8 | 0.8 |
| 5 | — | — | — | — | — | — | — | 0.3 | — | — |
| 6 | — | — | 0.08 | — | 0.1 | 0.1 | 0.1 | — | 0.3 | — |
| 7 | — | — | — | — | — | — | — | — | — | 0.3 |
| 8 | — | — | — | — | — | — | — | — | — | — |
| 9 | 0.05 | 0.05 | 0.05 | 0.05 | 0.05 | 0.05 | 0.05 | 0.05 | 0.05 | 0.05 |
| 10 | 0.1 | 0.1 | 0.1 | 0.1 | 0.1 | 0.1 | 0.1 | 0.1 | 0.1 | 0.1 |

1 polycarbonate resin, General Electric,
2 Bulk ABS, General Electric,
3 perfluorobutanesulfonate potassium salt, Bayer Corp,
4 polytetrafluoroethylene concentrate (as anti-drip), General Electric,
5 sodium dodecylbenzene sulfonate, Rhodia,
6 bis (dodecylsulfophenyl)ether disodium salt, Rhodia,
7 sodium naphthalene sulfonate, Rhodia,
8 pentaerythritoltetrastearate, Lonza,
9 (methylene (3,5-di-tert-butyl-4-hydroxyhydrocinnamate)) methane, hereinafter hindered phenol, Ciba Geigy;
10 tris (2,4-di-tert-butyl phenyl) phosphite hereinafter phosphate stabilizer, Ciba Geigy.

TABLE 2

UL94 Ratings

| Rating | Sample | | | | | | | | | |
|---|---|---|---|---|---|---|---|---|---|---|
|  | A | B | C | D | E | F | G | H | I | J |
| V0@ 3.2 | (B) | V-0 | V-0 | — | — | — | — | — | — | — |
| V0@ 2.3 | (B) | V-2 | V-1 | — | — | — | — | — | — | — |
| V0@ 2.0 | (B) | — | — | V-0 | V-0 | — | — | — | — | — |
| V0@ 1.6 | (B) | V-2 | V-2 | V-0 | V-0 | V-0 | V-0 | — | — | — |
| V0@ 1.2 | — | — | — | V-1 | V-0 | V-0 | V-1 | — | — | — |
| V0@ 0.8 | — | — | — | — | — | — | — | (B) | V-0 | V-2 | the current invention is surprising in that while it is known in the art of the flame retardant properties of halogenated molecules in thermoplastics, as with the perfluorobutane potassium sulfate in examples B and D, the current invention, bis(dodecylsulfophenyl)ether disodium salt examples C, E, F, and G, is a non-halogenated molecule that is more efficient in flame retarding a polycarbonate/ABS blend.

TABLE 3

| Increasing Flammability of PC/ABS Alloys with ABS Content | | | | |
|---|---|---|---|---|
| Parts by Wt. of Component | 1 | 2 | 3 | 4 |
| High Flow PC | 100 | 97 | 94 | 88 |
| Bulk ABS | 0 | 3 | 6 | 12 |
| Hindered phenol | 0.05 | 0.05 | 0.05 | 0.05 |
| Phosphate stabilizer | 0.1 | 0.1 | 0.1 | 0.1 |
| 10 sec. Flame FOT | 22.5 | 26.2 | 15.8 | 21.7 |
| Flaming Drips | 0 | 6 | 4 | 8 |
| Notes | Self-extinguishes | | | |

The data in Table 3 show that while polycarbonate self-extinguishes, the addition of ABS to the composition dramatically increases flammability, which increases with increasing ABS content.

What is claimed is:

1. A thermoplastic resin composition, comprising:
   (a) an aromatic carbonate resin,
   (b) a rubber modified graft copolymer comprising a discontinuous rubber phase dispersed in a continuous rigid thermoplastic phase, wherein at least a portion of the rigid thermoplastic phase is chemically grafted to the rubber phase and wherein the rigid thermoplastic phase has a glass transition temperature of at least 25° C., and
   (c) a flame retarding amount of an alkali metal or alkaline earth metal salt of an aromatic sulfonic diacid having aromatic centers that have at least one electron donating group.

2. The composition of claim 1, wherein the composition comprises, based on 100 parts by weight the thermoplastic resin composition, from 40 to 96 parts by weight of the aromatic polycarbonate resin, from 4 to 59 parts by weight of the rubber modified graft copolymer and additionally from 0 to 20 parts by weight of an organophosphorus flame retardant.

3. The composition of claim 1, wherein the polycarbonate resin is derived from bisphenol A and phosgene.

4. The composition of claim 1, wherein the rubber phase comprises a polybutadiene polymer or a poly(styrene-butadiene) copolymer and the rigid thermoplastic phase comprises structural units derived from one or more monomers selected from vinyl aromatic monomers and monoethylenically unsaturated nitrile monomers.

5. The composition of claim 4, wherein the rigid phase comprises a copolymer derived from monomers selected from the group consisting of styrene, α-methyl styrene and acrylonitrile.

6. The composition of claim 5 wherein the rubber phase comprises a polybutadiene polymer.

7. The composition of claim 6 wherein the rigid phase comprises a coplymer of styrene and acrylonitrile.

8. The composition of claim 7 wherein the rubber phase is produced by emulsion polymerization.

9. The composition of claim 8, wherein the emulsion polymerization is carried out in the presence of an amount of a chain transfer agent effective to provide a rubber having a swell index of greater than 15.

10. The composition of claim 2, wherein the composition comprises an organophosphorus flame retardant comprising one or more compounds according to the structural formula (VI):

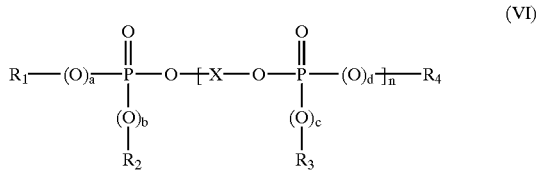

(VI)

wherein $R_1$, $R_2$, $R_3$ and $R_4$ are each independently aryl, which may be optionally substituted with halo or alkyl,
X is arylene, optionally substituted with halo or alkyl,
a, b, c and d are each independently 0 or 1, and
n is an integer from 0 to 5.

11. The composition of claim 1, wherein the composition further comprises a fluoropolymer, in an amount effective to provide anti-drip properties to the composition.

12. The composition of claim 11, wherein the fluoropolymer is a tetrafluoroethylene polymer.

13. The composition of claim 11, wherein the fluoropolymer is added to the composition in the form of an additive made by emulsion polymerization of one or more monoethylenically unsaturated monomers in the presence of an aqueous dispersion of the fluoropolymer.

14. The composition of claim 13, wherein the additive is made by emulsion polymerization of styrene and acrylonitrile in the presence of an aqueous dispersion of polytetrafluoroethylene particles.

15. An article made by molding the composition of claim 1.

16. A thermoplastic resin composition, comprising the composition resulting from blending:
   (a) a polycarbonate resin,
   (b) a rubber modified graft copolymer comprising a discontinuous rubber phase dispersed in a continuous rigid thermoplastic phase, wherein at least a portion of the rigid thermoplastic phase is chemically grafted to the rubber phase, and wherein the rigid thermoplastic phase has a glass transition temperature of at least 25° C., and
   (c) a flame retarding amount of an alkali metal or alkaline earth metal salt of an aromatic sulfonic diacid having aromatic centers that have at least one electron donating group.

17. A thermoplastic resin composition, comprising:
   (a) an aromatic carbonate resin,
   (b) a rubber modified graft copolymer comprising a discontinuous rubber phase dispersed in a continuous rigid thermoplastic phase, wherein at least a portion of the rigid thermoplastic phase is chemically grafted to the rubber phase and wherein the rigid thermoplastic phase has a glass transition temperature of at least 25° C., and
   (c) a flame retarding amount of an alkali metal or alkaline earth metal salt of a sulfonic diacid having aromatic centers with at least one electron donating group, said compound having the formula:

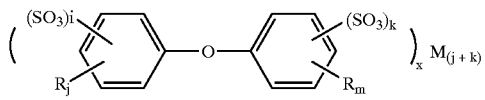

where R is independently for each substitution a one to forty carbon atom alkyl, aralkyl or aromatic group, M is a metal selected from the group of alkali metals and alkaline earth metals with x the oxidation state of the metal, M, where i, j, k and m are each integers ranging from 0 to 5 subject to the limitation that i+k is at least 1 and subject to the further limitation that i+j is less than or equal to 5 and k+m is less than or equal to 5.

18. The composition of claim 17, wherein the composition comprises, based on 100 parts by weight the thermoplastic resin composition, from 40 to 96 parts by weight of the aromatic polycarbonate resin, from 4 to 59 parts by weight of the rubber modified graft copolymer and additionally from 0 to 20 parts by weight of an organophosphorus flame retardant.

19. The composition of claim 17, wherein the polycarbonate resin is derived from bisphenol A and phosgene.

20. The composition of claim 17, wherein the rubber phase comprises a polybutadiene polymer or a poly(styrene-butadiene) copolymer and the rigid thermoplastic phase comprises structural units derived from one or more monomers selected from vinyl aromatic monomers and monoethylenically unsaturated nitrile monomers.

21. The composition of claim 20, wherein the rigid phase comprises a copolymer derived from monomers selected from the group consisting of styrene, α-methyl styrene and acrylonitrile.

22. The composition of claim 21 wherein the rubber phase comprises a polybutadiene polymer.

23. The composition of claim 22 wherein the rigid phase comprises a copolymer of styrene and acrylonitrile.

24. The composition of claim 23 wherein the rubber phase is produced by emulsion polymerization.

25. The composition of claim 24, wherein the emulsion polymerization is carried out in the presence of an amount of a chain transfer agent effective to provide a rubber having a swell index of greater than 15.

26. The composition of claim 17, wherein the composition further comprises an organophosphorus flame retardant comprising one or more compounds according to the structural formula (VI):

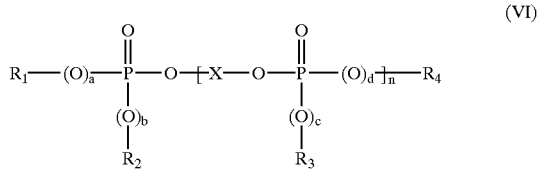

(VI)

wherein $R_1$, $R_2$, $R_3$ and $R_4$ are each independently aryl, which may be optionally substituted with halo or alkyl, X is arylene, optionally substituted with halo or alkyl, a, b, c and d are each independently 0 or 1, and n is an integer from 0 to 5.

27. The composition of claim 17, wherein the composition further comprises a fluoropolymer, in an amount effective to provide anti-drip properties to the composition.

28. The composition of claim 27, wherein the composition further comprises a fluoropolymer, in an amount effective to provide anti-drip properties to the composition.

29. The composition of claim 27, wherein the fluoropolymer is a tetrafluoroethylene polymer.

30. The composition of claim 29, wherein the additive is made by emulsion polymerization of styrene and acrylonitrile in the presence of an aqueous dispersion of polytetrafluoroethylene particles.

31. An article made by molding the composition of claim 17.

32. A thermoplastic resin composition, comprising the composition resulting from blending:

(a) a polycarbonate resin, (b) a rubber modified graft copolymer comprising a discontinuous rubber phase dispersed in a continuous rigid thermoplastic phase, wherein at least a portion of the rigid thermoplastic phase is chemically grafted to the rubber phase, and wherein the rigid thermoplastic phase has a glass transition temperature of at least 25° C., and (c) a flame retarding amount of an alkali metal or alkaline earth metal salt of a sulfonic diacid having aromatic centers with at least one electron donating group, said compound having the formula:

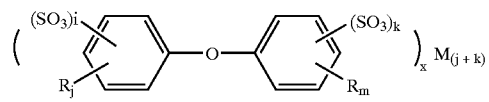

where R is independently for each substitution a one to forty carbon atom alkyl, aralkyl or aromatic group, M is a metal selected from the group of alkali metals and alkaline earth metals with x the oxidation state of the metal, M, where i, j, k and m are each integers ranging from 0 to 5 subject to the limitation that i+k is at least 1 and subject to the further limitation that i+j is less than or equal to 5 and k+m is less than or equal to 5.

* * * * *